United States Patent
Morrison

(10) Patent No.: US 8,764,455 B1
(45) Date of Patent: Jul. 1, 2014

(54) COMPREHENSION INSTRUCTION SYSTEM AND METHOD

(75) Inventor: Andrew S. Morrison, Deerfield, IL (US)

(73) Assignee: Altis Avante Corp., Evanston, IL (US)

( * ) Notice: Subject to any disclaimer, the term of this patent is extended or adjusted under 35 U.S.C. 154(b) by 0 days.

(21) Appl. No.: 13/095,617

(22) Filed: Apr. 27, 2011

Related U.S. Application Data

(60) Division of application No. 12/019,578, filed on Jan. 24, 2008, which is a continuation of application No. 11/430,325, filed on May 8, 2006, now Pat. No. 8,568,144, and a continuation of application No. 11/347,425, filed on Feb. 2, 2006, now abandoned.

(60) Provisional application No. 60/897,414, filed on Jan. 24, 2007, provisional application No. 60/679,145, filed on May 9, 2005.

(51) Int. Cl.
*G09B 3/00* (2006.01)
(52) U.S. Cl.
USPC .......................................... 434/323; 434/178
(58) Field of Classification Search
USPC .......... 434/323, 350, 178, 322, 362, 156, 365
See application file for complete search history.

(56) References Cited

U.S. PATENT DOCUMENTS

| | | | |
|---|---|---|---|
| 4,211,018 A * | 7/1980 | DeVoid et al. ................. | 434/178 |
| 4,411,628 A | 10/1983 | Laughon et al. | |
| 4,820,167 A | 4/1989 | Nobles et al. | |
| 4,907,971 A | 3/1990 | Tucker | |
| 5,010,495 A | 4/1991 | Willetts | |
| 5,088,928 A | 2/1992 | Chan | |
| 5,203,705 A | 4/1993 | Hardy et al. | |
| 5,267,865 A | 12/1993 | Lee et al. | |
| 5,727,950 A | 3/1998 | Cook et al. | |
| 5,749,736 A | 5/1998 | Griswold et al. | |
| 5,779,486 A * | 7/1998 | Ho et al. ........................ | 434/353 |
| 5,810,605 A * | 9/1998 | Siefert ........................... | 434/362 |
| 5,813,861 A | 9/1998 | Wood | |
| 5,820,386 A | 10/1998 | Sheppard, II | |
| 6,022,221 A | 2/2000 | Boon | |
| 6,077,085 A | 6/2000 | Parry et al. | |
| 6,301,571 B1 * | 10/2001 | Tatsuoka ........................ | 706/45 |
| 6,302,695 B1 | 10/2001 | Rtischev et al. | |
| 6,419,496 B1 * | 7/2002 | Vaughan, Jr. .................. | 434/322 |
| 6,554,618 B1 * | 4/2003 | Lockwood ..................... | 434/322 |
| 6,585,519 B1 | 7/2003 | Jenkins et al. | |
| 6,606,479 B2 | 8/2003 | Cook et al. | |
| 6,606,480 B1 * | 8/2003 | L'Allier et al. ............... | 434/362 |
| 6,652,283 B1 | 11/2003 | Van Schaack et al. | |
| 6,676,413 B1 * | 1/2004 | Best et al. ..................... | 434/178 |

(Continued)

OTHER PUBLICATIONS

PCT International Search Report, PCT/US06/04309, dated Aug. 7, 2007.

(Continued)

*Primary Examiner* — Peter Egloff
(74) *Attorney, Agent, or Firm* — Marshall, Gerstein & Borun LLP; Randall G. Rueth

(57) ABSTRACT

A reading comprehension system and method that uses language micro-variables is disclosed. The system provide training using these language micro-variables in order to provide reading comprehension training. This training also is highly impactful for the instruction and improvement of reading fluency and vocabulary.

6 Claims, 6 Drawing Sheets

(56) References Cited

U.S. PATENT DOCUMENTS

| | | |
|---|---|---|
| 6,688,889 B2 | 2/2004 | Wallace et al. |
| 6,726,486 B2 | 4/2004 | Budra et al. |
| 6,905,341 B1 | 6/2005 | Whitaker et al. |
| 7,153,137 B2 | 12/2006 | Altenhofen et al. |
| 7,153,140 B2 | 12/2006 | Ivanir et al. |
| 7,386,453 B2 | 6/2008 | Polanyi et al. |
| 7,396,281 B2 | 7/2008 | Mendelsohn et al. |
| 7,677,967 B2 | 3/2010 | Jessop et al. |
| 2001/0018177 A1 | 8/2001 | Van Dusen |
| 2001/0039002 A1 | 11/2001 | Delehanty |
| 2001/0041330 A1 | 11/2001 | Brown et al. |
| 2001/0049085 A1 | 12/2001 | Wasowicz |
| 2002/0107681 A1* | 8/2002 | Goodkovsky ............... 703/22 |
| 2003/0017442 A1* | 1/2003 | Tudor et al. ............... 434/322 |
| 2003/0152901 A1 | 8/2003 | Altenhofen et al. |
| 2004/0115597 A1* | 6/2004 | Butt ............... 434/156 |
| 2004/0115600 A1* | 6/2004 | Wasowicz et al. ............ 434/169 |
| 2004/0152054 A1 | 8/2004 | Gleissner et al. |
| 2004/0197759 A1 | 10/2004 | Olson |
| 2005/0026129 A1 | 2/2005 | Rogers |
| 2005/0048449 A1 | 3/2005 | Marmorstein et al. |
| 2005/0095571 A1* | 5/2005 | Miller ............... 434/350 |
| 2005/0153263 A1 | 7/2005 | De Ley et al. |
| 2006/0166174 A1* | 7/2006 | Rowe et al. ............... 434/236 |
| 2007/0048696 A1 | 3/2007 | Blank |

OTHER PUBLICATIONS

PCT Written Opinion, PCT/US06/04309, dated Aug. 7, 2007.
PCT International Search Report, PCT/US06/18010, dated May 2, 2008.
PCT Written Opinion, PCT/US06/18010, dated May 2, 2008.
Weckerly, J., and Elman, J.L. "A PDP Approach to Processing Center-Enbedded Sentences." Proceeding of the Fourteenth Annual Conference of the Cognitive Science Society. 1992. Hillsdale, NJ: Erlbaum.
"Comparatives & Superlatives." Woodward Chile [online]. Dec. 6, 2007, Santiago, Chile [retrieved on Apr. 13, 2008]. Retrieved from the Internet<URL:http://grammar.cl/Intermediate/Comparatives_Superlatives.htm>.
Boudeguer, et al. How ESL Students Resolve Anaphora in Reading Research/Technical Report [online], 1992 [retrieved on Jun. 8, 2009]. Retrieved from the Internet<URL: http://www.eric.ed.gov/ERICDocs/data/ericdocs2sql/content_storage_01/0000019b/80/13/c9/98.pdf.

* cited by examiner

COMPREHENSION INSTRUCTION SYSTEM AND METHOD

RELATED APPLICATION/PRIORITY CLAIM

This application is a divisional of and claims priority under 35 USC 119(e) to U.S. patent application Ser. No. 12/019,578 filed on Jan. 24, 2008 and entitled "Comprehension Instruction System and Method", which claims priority under 35 USC 119(e) to U.S. Provisional Patent Application Ser. No. 60/897,414 filed on Jan. 24, 2007 and entitled "Comprehension Instruction System and Method", claims priority under 35 USC 120 to U.S. patent application Ser. No. 11/430,325 filed on May 8, 2006 and entitled "Comprehension Instruction System and Method" which in turn claims priority under 35 USC 119(e) and 120 to U.S. Provisional Patent Application Ser. No. 60/679,145 filed on May 9, 2005 and entitled "Comprehension Instruction System and Method" and claims priority under 35 USC 120 to U.S. patent application Ser. No. 11/347,425 filed on Feb. 2, 2006 and entitled "On-Task Learning System and Method", the entirety of all of which are incorporated herein by reference.

APPENDIX

Appendix A is a 37 page document that contains the screen shots of a mock-up of a software-based training system that embodies the concepts disclosed in this application. This appendix forms a portion of this patent application.

FIELD OF THE INVENTION

The invention relates generally to a computer-implemented system and method for educational training and in particular to a computer-implemented system and method for reading comprehension training. Also, this process is highly impactful for the instruction and improvement of other areas of reading-related instruction, including phonics, fluency, high-frequency words and phrases, and vocabulary (including morphology, multiple meaning words, homophones and idioms).

BACKGROUND OF THE INVENTION

Traditionally, reading comprehension is taught using a first approach, a second approach or a combination of the two approaches. The first approach is not reading comprehension, per se, but instruction in basic, related skills that enable comprehension to take place. For example, to understand a passage it is necessary to decode the words effortlessly (so that attention isn't diverted from comprehension), read fluently (that is, recognize the words in text quickly, accurately, and to translate them into prosodic units as opposed to words), and know the meanings of the words. It is clearly proven that improving word recognition, decoding, reading fluency, and vocabulary knowledge all have a positive impact on reading comprehension itself.

The other approach is what is usually referred to as comprehension strategies instruction. Comprehension strategies instruction explicitly provides students with approaches to thinking during reading that have been found to improve reading comprehension, at least with low reading comprehension level readers. Some of the strategies that have been successful include teaching students to summarize text, to engage their prior knowledge before reading, to question the text, to translate the text information into graphic form, to use story maps (to summarize narrative text), and to monitor understanding. These strategies are not skills-based instruction (see below), nor are they teaching activities, but rather they are activities that readers are supposed to carry out during their reading on an independent basis. Most programs emphasize the teaching of strategies as the major or sole focus of direct reading comprehension instruction. These approaches do not, however address the more basic underlying problems of a poor reader and thus it is desirable to provide a reading comprehension system that addresses this limitation of the typical approaches and it is to this end that the present invention is directed.

SUMMARY OF THE INVENTION

A comprehension instruction system and method are provided that is a new approach to teaching reading comprehension. The new approach is based on the idea that poor readers struggle with more basic aspects of information or language processing than just the gross aspects of paying attention to the big ideas of a text that are focused on with the prior approaches. The struggle with more basic aspects of information and language processing occur because poor readers may have trouble processing language at a more basic "molecular" level.

For example, if a good reader is reading a really hard biology text that he or she will be tested on, then it makes great sense to read with deep intention using the kinds of strategies or study skills stressed above. However, with most text, good readers do not engage in such substantial effort of consciously using these reading strategies; rather, good readers read the text and process the information seemingly without intention, attention, or effort.

That is not the case for poor or struggling readers. That is, their problems can be at the "molecular level" of comprehension; their difficulty is in grasping the basic concepts imbedded in the words and seeing the relationships among these concepts. One suspects these students do not automatically draw connections among the parts of sentences and texts in the same way that good readers do. For example, when presented a single sentence like, "Maya feats of engineering are even more amazing considering that they did it all without wheeled vehicles or draft animals and without metal tools," a poor reader might only be able to tell vaguely that the sentence had something to do with Maya tools or that the Maya were amazing. But if asked, "What did the Mayan's do that was so amazing?" or "Why was the Mayan accomplishment so amazing?" they tend to struggle and be unable to provide a coherent answer. Of course, as sentences are added to the text base, building on and extending this information, even the use of simple pronoun links or references are likely to multiply these initial confusions and the student is in real trouble.

Studies of the impact of phonics instruction are informative here. Teaching students to decode improves reading achievement including reading comprehension for children in kindergarten, first, and second grade. However, instruction in phonics beyond those grade levels apparently does not materially improve reading comprehension. Similarly, it has been found that phonics instruction is beneficial to second language students, but that the effects of such instruction are of lesser benefit to them than for students whose first language is English. Finally, studies of young children find that their vocabulary development and listening skills are not very predictive of their beginning reading skills, but are more predictive of later reading achievement.

These findings suggest that reading comprehension, particularly beyond the second grade level, is highly dependent on oral language development. This means that one way to help build reading comprehension is to further develop students' oral language capacity so that the words they decode will be meaningful (i.e., that they can be matched with the reader's knowledge).

Studies show that children differ dramatically in the amount of direct experience with language they bring to school (it is estimated that children raised in welfare will have about one million words spoken to them by the time they enter school, while their more advantaged peers will have experienced about 15 million words). Of course, this suggests that students are likely to be deficient in vocabulary and that increasing the knowledge of words and concepts will raise reading achievement. This most certainly is correct as various studies have shown. However, it also suggests that students will struggle with other aspects of language as well. This has less often been the subject of research, and rarely has been the focus of instructional programs. The point here is that students have trouble not only with words, but with the relationships among words, as they would have had as little experience with this aspect of language as they had with words.

As described above, past responses to reading problems have aimed at improving decoding and fluency (so these can pose no impediment), providing explicit teaching of vocabulary for this specific text (e.g, feat), or providing guidance in the use of comprehension strategies (at the end of reading this section, sum up in your own words what the text said). It should be evident that these solutions are not likely to work very well here, or if they did their benefit would be with this specific passage rather than with general reading ability.

The reading comprehension system in accordance with the invention provides students with a substantial amount of intensive and focused instruction and/or practice at the "molecular level", or in interpreting micro-relationships among individual words, clauses and sentences under precisely controlled and varied conditions. This type of training will provide the user with an understanding of the language at a micro-level. In particular, there are various micro-aspects of language that vary in ways that make comprehension easier or harder. By precisely controlling and manipulating these variables (known as language micro-variables), one can provide direct, explicit instruction to develop comprehension skills that will result in improved reading comprehension, as compared to previous approaches to teaching comprehension in which related skills are taught (e.g., vocabulary instruction) or where general thinking strategies are taught (e.g, summarizing).

In accordance with the invention, a reading comprehension training system is provided that has a computing device and a game logic portion that generates a reading comprehension exercise at a particular skill level. The system also has a user interface portion that generates a user interface for the reading comprehension exercise at a particular skill level wherein the user interface for the reading comprehension exercise at a particular skill level is displayed on the computing device. The game logic portion also has a game administrator portion that adjusts the skill level of the reading comprehension exercise based on one or more micro-aspects of language that adjust a difficulty level of the reading comprehension exercise.

DETAILED DESCRIPTION OF A PREFERRED EMBODIMENT

The invention is particularly applicable to a personal computer-based, software implemented reading comprehension system and method and it is in this context that the invention will be described. It will be appreciated, however, that the invention has greater utility since the invention may be used with a variety of different computer systems (that have computing devices) as well as implemented in hardware or software without departing from the scope of the invention. For example, the computer may be a client/server type system, a web-based system, a wireless system, a PDA-based system, a network-based system, a mobile phone system or a portable computing device based system. Similarly, the invention can be implemented as software (as described below), but the software also be embedded into a hardware device or implemented using hardware logic. The system may also be used to train other language-related skills including reader fluency and vocabulary.

The reading comprehension system and method in accordance with the invention provides the user with training at a language micro-variable level to provide students with a substantial amount of intensive and focused instruction and/or practice at the "molecular level", or in interpreting micro-relationships among individual words, clauses and sentences under precisely controlled and varied conditions. The initial level of training can start in one or more different ways. For example, the system may perform an initial assessment of the user to determine the proper starting point for the training. Or, during other instruction, the program may (i) track the instances where a student has missed comprehension-type questions about a text or otherwise demonstrated poor comprehension, (ii) evaluate the structure or micro-variables contained in the specific language or text that contain the answer that the student missed and (iii) provide micro-comprehension training for the student that matches the kinds of structures the student is struggling with. Or, alternatively, a teacher can place the user at a particular starting point or the system may start each user at a default level. Thus, the system may start at a level of difficulty and then adjust the difficulty of the training as the user becomes more proficient or less proficient. In more detail, the various micro-aspects of language may be varied in ways that make comprehension easier or harder. By precisely controlling and manipulating the micro-aspects of language, the system provides direct, explicit instruction to develop comprehension skills that will result in improved reading comprehension, as compared to previous approaches for teaching comprehension in which related skills are taught (e.g., vocabulary instruction) or where general thinking strategies are taught (e.g, summarizing).

Figure 1:
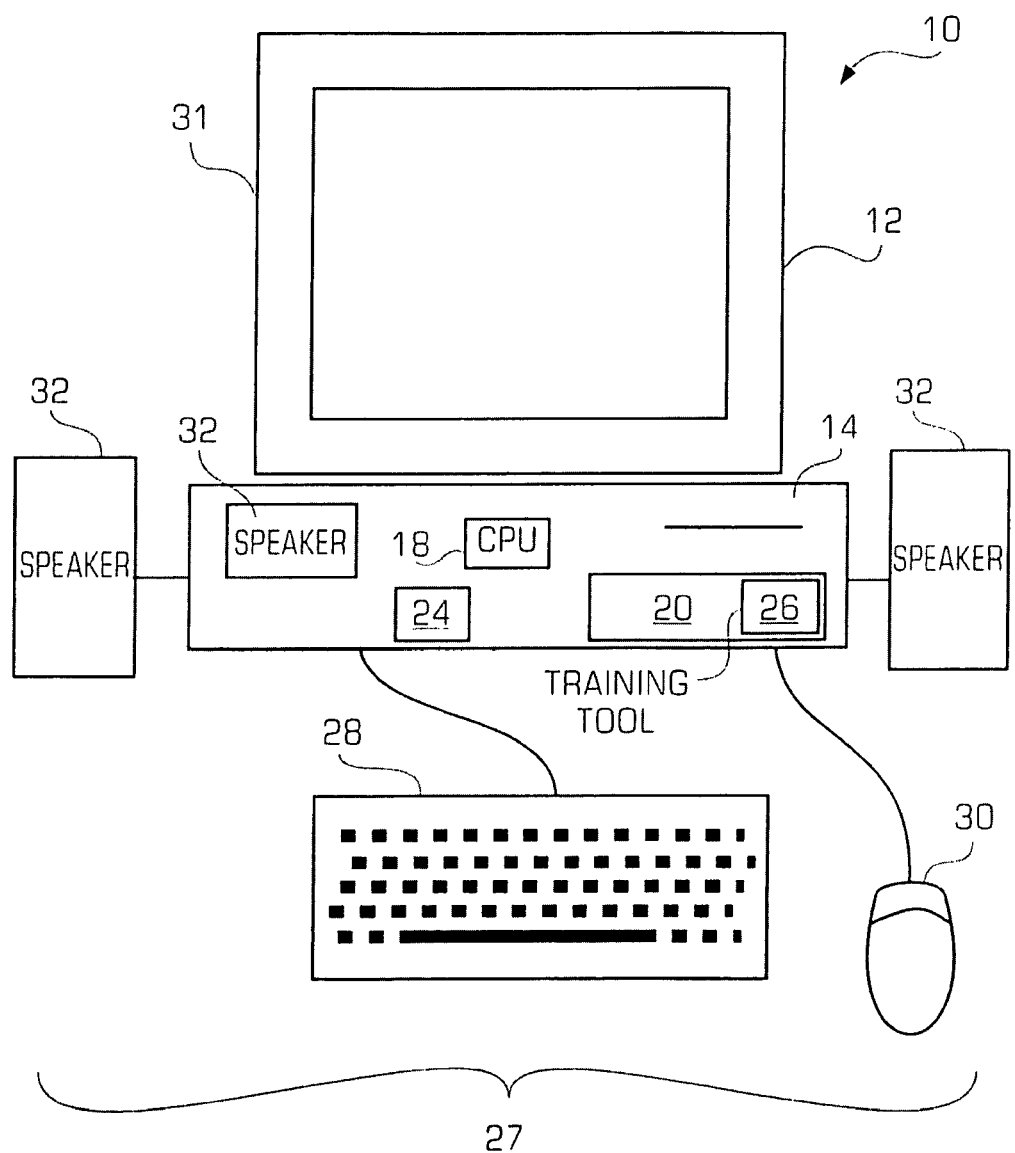
FIG. 1 is a diagram illustrating an exemplary computer-based reading comprehension training system in accordance with the invention.

FIG. 1 is a diagram illustrating an exemplary personal computer-based reading comprehension training system 10 in accordance with the invention wherein the personal computer is an example of a computing device. In accordance with the invention, the system also may be implemented on a variety of other, different known computer systems/computing devices that are within the scope of the invention. For example, the system may be implemented as a client/server system, a peer to peer system, a workstation, a mainframe system, networked over a computer network, such as a LAN or WAN, etc. The exemplary system shown in FIG. 1 may include a display device 12, such as a LCD display, on which the training will be displayed to the user, and a chassis 14 that houses a processing unit 18 that controls the system, a memory 20, such as a static or dynamic random access memory or flash memory, that holds software and application being currently executed by the processing unit to implement the training system and a persistent storage device 24, such as a hard disk drive, flash memory, optical drive, etc. that stores the software and applications and retains the data when the power is turned off to the computer system as is well known. Depending on the particular computer implementation of the system, the elements shown in FIG. 1 may or may not be present in each particular implementation. In accordance with the invention, to implement the training system in accordance with the invention, the memory 20 may store a training tool 26 that is executed by the processing unit to implement the reading comprehension system. The computer system may also include one or more input/output devices that permit the user of the system to interact with the computer system. Those input/output devices may include a printer (not shown), a connection to the Internet or network (not shown), a keyboard 28, a mouse 30 and one or more speakers 32. The computer system may also include a sound input device (not shown), such as a microphone, to provide speech recognition and/or a touchscreen (not shown).

In accordance with the invention, the training system software in the preferred embodiment of the invention may be provided to the computing device on a piece of media, such as a CD or memory stick or disk, it may be preloaded on the computing device, or the software may be downloaded/communicated over a link to the computing device. In accordance with one aspect of the invention, a portion of the training software may be communicated to the computing device and executed by the processing unit and then additional training modules/portions of the software can be communicated to the computing device at different times.

Figure 2:
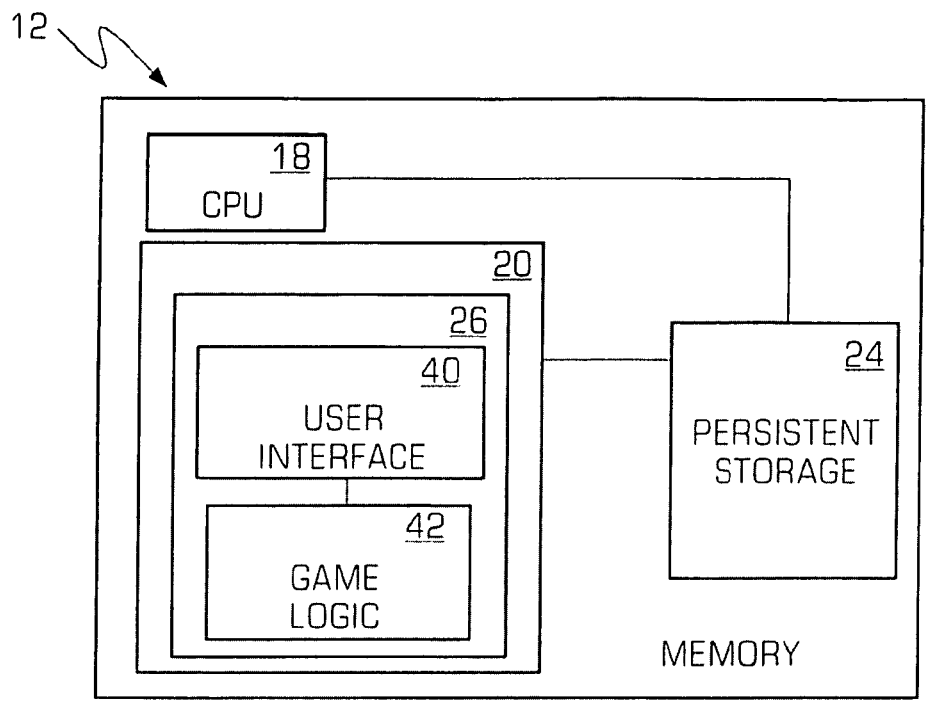
FIG. 2 is a diagram illustrating details of the software implemented reading comprehension training system in accordance with the invention.
Figure 3:
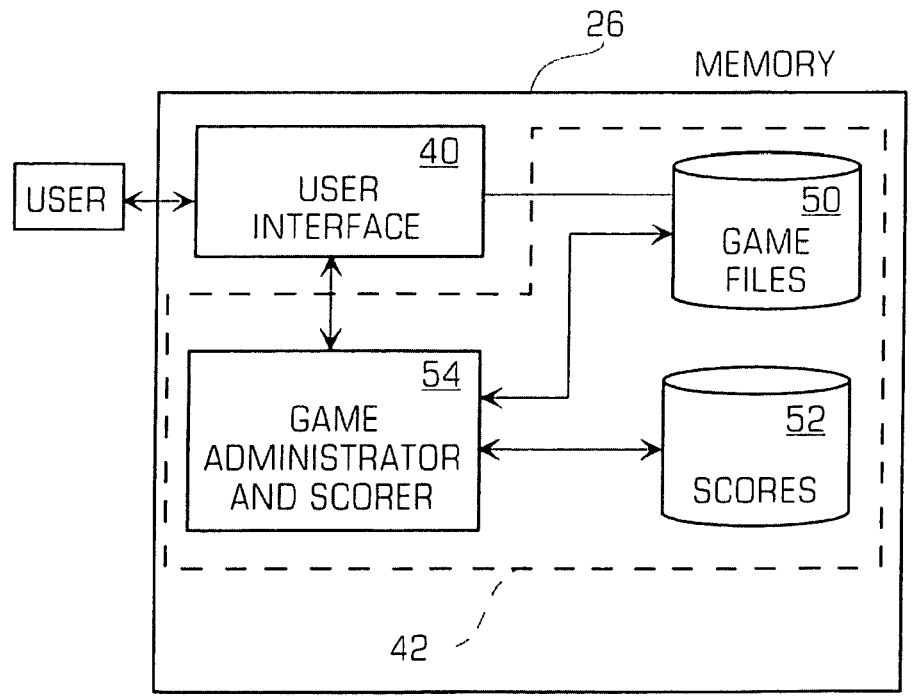
FIG. 3 is a diagram illustrating further details of the software implemented reading comprehension training system in accordance with the invention.

FIG. 2 is a diagram illustrating details of the software implemented reading comprehension training system in accordance with the invention and FIG. 3 is a diagram illustrating further details of the software implemented reading comprehension training system in accordance with the invention. In a preferred embodiment, the training tool comprises a plurality of lines of computer code that are executed by the processing unit. The training tool may be implemented as a single software application or as a series of interconnected software modules. The training tool may also consist of one or more training modules/segments/assignments that may or may not be resident on the computing device when the training tool is used since the training modules/segments/assignments may be communicated to the computing device as needed. The training tool 20 further comprises a user interface portion 40 and a game logic portion 42 that are executed by the processing unit 18 to implement the reading comprehension training system. The user interface portion 40 may generate the user interface of the training presented to the user (See FIG. 3) while the game logic 42 performs the other functions of the training system. In the example shown in FIG. 2, the user interface portion 40 and game logic portion 42 are resident on the personal computer. However, the user interface portion 40 and game logic portion 42 may also be split between a computing device and a server computer in the example of the training system shown in FIG. 5. Alternatively, the user interface portion 40 and game logic portion 42 may be located on the server that generates one or more training user interface web pages that may be communicated to a computing device on which the user interacts with the training wherein the responses of the user are communicated back to the server using a known protocol such as HTTP.

As shown in FIG. 3, the game logic 42 may further include a game administrator and scorer module 54, one or more games files 50 and a scores database 52. Thus, the game administrator module may determine the appropriate training for a particular user, pull that training game/module from the game files 50 and then instruct the user interface portion 40 to generate the user interface to be displayed to the user. The user may then respond to the training which is captured by the scorer and stored in the scores database 52. The game administrator module also controls the level of difficulty of the training based on the response of the user to the current level of difficulty of the training as described in more detail below. Generally, the different training provided by the system corresponds to different language micro-variables that, when learned, improve the reading comprehension of the user.

Figure 4A:
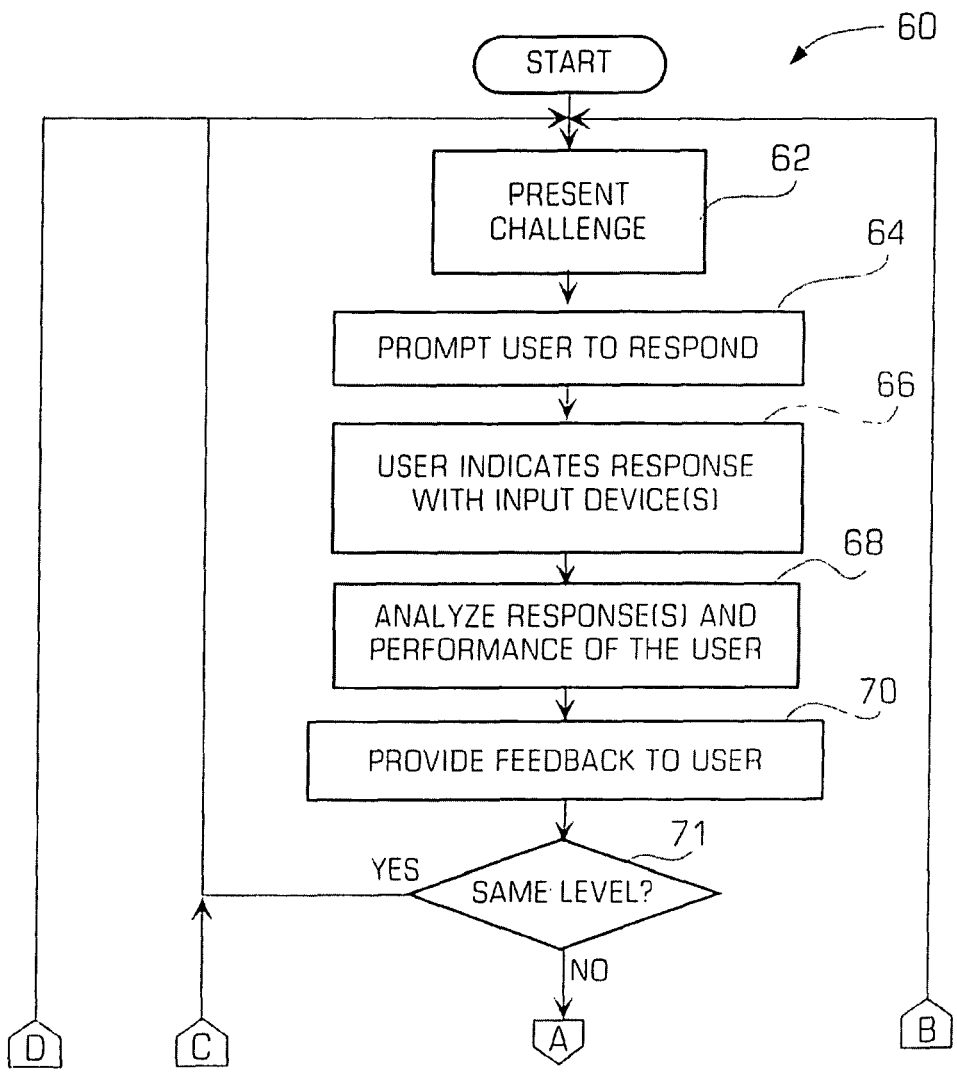
FIGS. 4A and 4B are a flowchart illustrating a method for reading comprehension training in accordance with the invention.
Figure 4B:
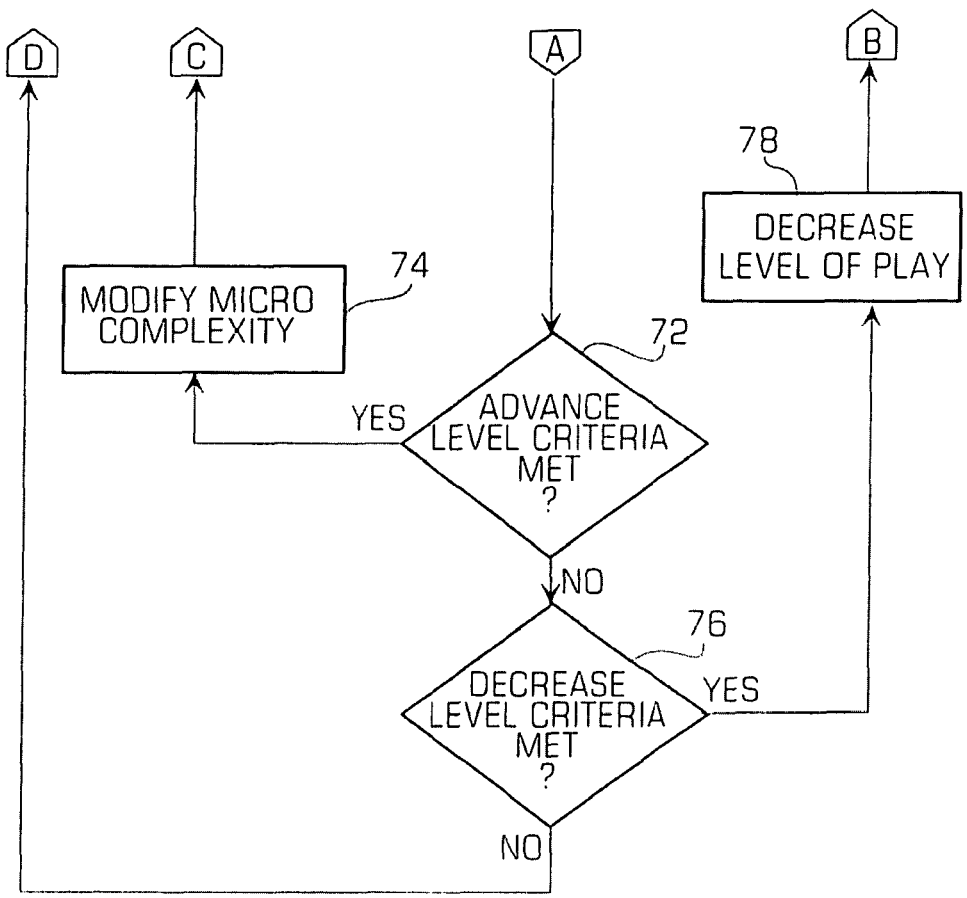

FIGS. 4A and 4B are a flowchart illustrating a method 60 for reading comprehension training in accordance with the invention. In this method, the user is presented with a challenge to answer in step 62. The challenge involves a reading comprehension problem that contains a language micro-variable at a particular level in accordance with the invention. Examples of these language micro-variables are provided below. The challenge has a particular level of difficulty that is adjusted based on the level of proficiency of the user so that the training is customizable to the skills of the user. In step 64, the user is prompted to respond to the challenge. The challenge may involve one or more questions. In step 66, the user indicates his/her response or series of responses using one or more input devices. In step 68, the training system analyzes the response or series of responses and provides feedback to the user in step 70. In step 71, the system determines if the user should stay at the same level/training in order to practice. If so, the method loops back to step 62. If not, then in step 72, the system may determine if the level of difficulty of the training should be adjusted (increased, decreased or otherwise changed) based on the user response(s). If the level should be increased, the system modifies the micro-complexity in step 74 and presents the harder/different challenge to the user. Examples of how the difficulty may be adjusted for several language micro-variables is set forth below in the text and Table 1. In step 76, if the difficulty should not be increased, the system determines if the difficulty should be decreased and can either decrease the level of play in step 78, maintain the same level of difficulty or move to a new level of difficulty that is not harder or easier, but is different. When the training is adjusted in step 72, the system may change one or more of the micro-variables at any time during the training provided to the user.

Now, several examples of the novel language micro-variable used in the training system to teach reading comprehension are provided. These language micro-variables include, but are not limited to, the variables set forth in Table 1, below. Table 1 below also illustrates examples of the difficulty continuum that may be employed by the training system to adjust the level of the training The language micro-variables may include, but are not limited to, verbs, agents, word and relationships. Each of these examples will now be described in more detail.

Micro-Variables for Verbs

A verb plays a central role in comprehension since verbs are the center of meaning in any sentence. With an understanding of the verb, it becomes possible to link the agents (or subjects) and the objects to the verb and to each other. Without a good understanding of what verbs are communicating in and across sentences, accurate comprehension is virtually impossible.

Some existing programs may teach the definitions and conjugations of verbs, recognizing verbs in context and even connecting verbs to agents and objects (i.e., subjects and predicates). In this invention, however, we precisely control the micro-variables of text. We have identified additional textual variables that impede comprehension. Some examples with respect to verbs include: (i) comprehension is harder when the verb occurs later in the sentence than earlier (In the winter we climbed from the hollow to Baker's ridge.); (ii) comprehension is harder when there is more distance between the subject and the verb (Papa spent the whole day basting the roast goose for mama.); (iii) comprehension is harder when there are distractors, like adverbs that make identification of the verb in that sentence ambiguous, or more difficult (see, "spent" in the previous example); (iv) comprehension is harder when there are multiple verbs in the same sentence (Papa cut a fresh tree up on the ridge, and we pulled it home on a tin sled.); (v) comprehension is harder when there are multiple verbs in the same sentence and there is a single subject that is not repeated for the second verb (When we got home, we hung our wet clothes over the stove to dry and warmed ourselves in Mama's kitchen.); (vi) comprehension is harder when the verb describes a cognitive state (Everything felt special.); (vii) comprehension is harder in cases of questions, or with verbs describing saying, thinking or believing or in cases of commands ("Read a book," said Mrs. Quimby.).

Micro-Variables for an Agent

An agent also plays a central role in comprehension since verbs always have agents. The agent is the one who takes action or whose state of being is being described by the verb. Once a student has understood the verb (see examples above), the student must also figure out who or what is taking this action. As with the verbs, micro-aspects of the text can greatly impede comprehension of the agents as shown by the following examples:

In the winter we climbed from the hollow to Baker's Ridge.
  Who climbed from the hollow to Baker's Ridge?
Our sleds were made from leftover tin used for roofs, and we rode them down through the woods by moonlight.
  What was made from leftover tin?
  Who rode the sleds?
When the black creek was frozen, we shared a few skates and everyone took a turn.
  What was frozen?
  Who shared a few skates?
  Who took a turn?
Mother, can I go to the circus?
  Who wants to go to the circus?

As with the verbs above, similar types of micro-variables can be identified and precisely manipulated for many other aspects of language. In the case of verbs, this type of precise, direct comprehension instruction applies to direct objects, and verb modifications of all sorts (e.g., relative clauses, adjectives, adverbs, negated propositions, superlatives, comparatives, questions as modifiers, causal verbs as modifiers, etc).

Micro-Variables Related to Reference

The meaning of some words cannot be interpreted semantically, but make reference to something else for their interpretation. Repeated discourse referents are a source of coherence in text since it creates a textual web by making the reader engage in processes that strengthen the links between the parts.

There are three types of words that carry referential meaning in English: personals, demonstratives, comparatives with examples set forth below. The reference can be anaphoric or cataphoric. Anaphora means that the reference is to preceding text (most examples are anaphoric so these will not be labeled as such, but examples of cataphora will be). To interpret anaphoric reference, the reader must either hold the semantic referent in memory which will allow for an immediate satisfaction or completion of the reference or must go back to retrieve the referent upon confronting the personal, demonstrative, or comparative in the later text. Cataphora presents elements that do not seem to link to anything, but then get resolved later by the eventual appearance of the referent.

Personals: I, me, he, she, they, it, you, we, us, him, her, them, one, mine, yours, ours, hers, him, my, your, our, its, one's. Connections are through person: number of people, gender, speaker, spoken to, spoken about, generalized person. These are links made with pronouns.

Three blind mice, three blind mice. See how they run! See how they run?
  Who are they? (They are three blind mice.) This is a simple pronoun reference.
The Queen said: 'Curtsey while you're thinking what to say. It saves time.' (The reference is to a thing, but not in a narrow sense, it is to a process or complex phenomenon).
  What saves time? (Curtsey at the same time that you are thinking)
  This is an extended reference (same as the above example, but it is more than word matching).
He who hesitates is lost.
  Who is he? (The one who hesitates.)

Demonstratives: There, here, this, these, that, those, the (connections are through location on scale of proximity: near, far, neutral))

Doctor Foster went to Gloucester in a shower of rain. He stepped in a puddle right up to his middle and never went there again.
  Where did Doctor Foster never go back to? (Gloucester.)

Comparatives: Another, better, more, less, similar, similarly, likewise, so, such, identically, differently, otherwise, equally, etc. (connections through identity or similarity)

There were two wrens upon a tree. Another came, and there were three.
  What came? (A wren or another wren.)

Anaphora:
we use pronouns to refer to entities in the focus of attention
with multiple antecedents contextual cues are needed to disambiguate a pronoun Anaphora use is rule driven.
referents in the discourse focus are more likely to be selected as the pronoun antecedent than are less discourse relevant referents.
referents that are more recently mention are more likely to be selected as the pronoun referent
prior topicalization makes an antecedent more salient All aspects of language are subject to this identification of the micro-aspects of text that impede comprehension, and then to the rigorous, controlled manipulation of each of these variables to identify, instruct and provide individualized practice for each student in mastering those text barriers that are impeding his or her comprehension.

Application of Micro-Variables

As already discussed, there are many micro-aspects to language that interfere with a student's ability to comprehend what he or she has read. For example, typically it is harder to identify an item if its placement is varied (at the beginnings, middles, or ends of sentences, for instance) or if it is multiple (e.g., two verbs are harder to identify than is a single verb), and relationships are harder if the items that need to be linked are at a greater distance from each other or if there is intervening information that competes for the link (for example, it is probably harder to determine who got the watch in a sentence like, "Dave gave his brother Tom's watch to Bill" than in a sentence like "Dave gave the watch to Bill.")

In the present invention, the student would start out with a simple problem. If he/she succeeds, the training system adds micro complexity and the student is given the harder problem. If the student succeeds with the harder problem, then more micro complexity is added and so on. As mentioned in the table below, one type of complexity is to mix multiple types of micro-complexity together. In this manner, the system precisely isolates the aspects of language that are impeding a student's comprehension. The program would then target direct instruction on that particular aspect of language. As the student becomes more proficient at that aspect of language, the program would further increase the difficulty of the challenge, either by making that particular skill level harder (e.g., adding even more distance between verb and agent), by presenting aspects of language that the student still has not mastered, or by combining one or more additional language complexities together. The instruction would continue in that fashion from one language construction or syntactic structure to another (or combinations thereof), with lots of varied practice and review.

Some language constructions will be easier than others (it is easier to identify a specific element in a sentence such as a subject or a verb than to interpret a relationship; or concrete items are usually easier to interpret than abstract ones). However, any construct or type of relationship will be harder to interpret as we change the context. Table 1 indicates some of the varied ways that difficulty can be manipulated to ensure that a student really can handle the skill.

As discussed above, most work on comprehension these days emphasizes the "strategic" aspects. These are the actions the reader can take intentionally to try to understand or remember a text. For example, students might be told to translate a text into a graphic image to better remember it or to appreciate the inter-relationships among major concepts. This kind of a strategy is not to be used automatically, but instead, the reader is to choose to use this for particular reasons under particular conditions. In some ways, it could be thought of as an approach to studying text, rather than a reading skill.

Skills are different than strategies in that they are to be carried out with little or no conscious attention. For a good reader, sentences like, "John cried." Or, "The flag is red, white, and blue." are not particularly difficult to interpret and probably entail very little conscious or formal analysis. In other words, the reader might need strategies to operate on the whole text, but these simple sentences pose so little difficulty they can be interpreted in a skilled manner. The purpose of this aspect of the intervention is to develop reading comprehension as a skilled activity.

Although knowledge of grammar is related to reading, these relationships have not been measured frequently and the correlations are not particularly high. Likewise, the teaching of formal grammar by various approaches has not usually had much impact upon reading comprehension. Methods of instruction that have been effective in this regard have typically focused on the meaningful interpretation and construction of language (such as sentence combining activities), rather than the study of grammatical forms. These findings are consistent with the psychological studies of Walter Kintsch and the linguistic analyses of Michael Halliday and Ruquaiya Hasan: "By contrast to substitution, which is a grammatical relation, reference is a semantic relation." The implications of this distinction in their example means that the relations being described in a language do not need to be constrained by grammatical conditions such as matching parts of speech and that what is focused on more than structural properties of language are semantic or meaning relations. This means that a sound program of comprehension instruction will engage students deeply in interpreting the meaning of text; not in the most global or macular terms alone (what was the text about?), but in much more specific terms that require the interpretation of all of the myriad ideas in the text. The training system aims to intensively "pattern" student interpretation of language so that they are able to automatically envision the meanings of words and the relationships among meanings of words.

TABLE 1

Examples of Difficulty Continuum

Reading Level: The difficulty of the text itself—in terms of sentence complexity or vocabulary challenge can influence how well a skill can be executed. If a text is at a $3^{rd}$ grade level, then a student will be more likely to be able to execute a particular skill than he or she could if the text were written at the $5^{th}$ grade level. This can apply to grade levels of K-12 and beyond.

| Kindergarten | 1st grade | 2nd grade | ... | 12th grade and beyond |
|---|---|---|---|---|

Amount of Text: It is generally easier to carry out a task with a small amount of text than with a larger amount as this other information can overwhelm or distract the reader and it creates more opportunities for error (e g , linking to the wrong information, getting tripped up by a vocabulary term).

| Short sentence | Longer sentence | Paragraph | Larger pieces of text (such as multiple paragraphs, a page, multiple pages, sections and multiple sections) |
|---|---|---|---|

TABLE 1-continued

Examples of Difficulty Continuum

Varied Practice: It is harder to execute a skill when it has to be one of several skills applied than when it is the only skill that is being exercised.

| All practice items emphasize a particular concept, relationship, or skill. | Items require a choice among two or more concepts, relationships, or skills (the greater the number of choices, the harder it will be to execute). | |
|---|---|---|

Varied Context: It is harder to identify an element when it appears in multiple places within a sentence or when it appears in various forms.

| Beginning of sentence | Middle of sentence | End of sentence |
|---|---|---|
| Identical element | Similar element | Element seems quite different from the example |
| No competing element | Competing element, but dissimilar | Competing element that could create ambiguity or confusion |

Varied Distance: It is harder to draw a relationship between two elements when there is a greater distance between them, or when there are competing elements that seem attractive as potential links.

| Contiguous elements | Elements separated by a small distance | Elements separated by a great distance |
|---|---|---|
| No competing elements | Competing elements but no ambiguity (perhaps the items differ from the link in terms of number or number) | Competing elements are potentially ambiguous (need to rely on meaning alone to make the link) |

Recognition-Construction: It is easier to pick the right answer than to construct one, it is easier to select a correct answer when there are few choices than when there are many, and the more similarity among the choices the harder.

| Recognition | Construction |
|---|---|

Figure 5:
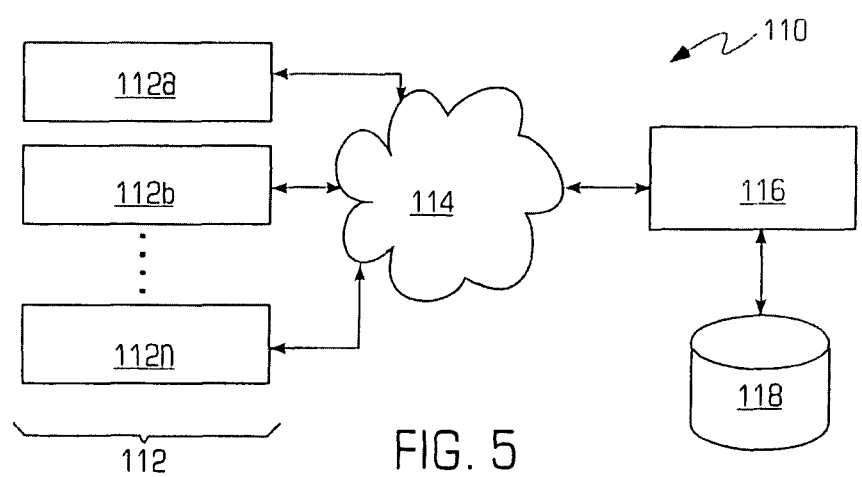
FIG. 5 illustrates an embodiment of the training system in a networked computer environment.

FIG. 5 illustrates an embodiment of a training system 110 in a networked computer environment that includes one or more computing devices 112 that are capable of connecting to a link 114 so that the one or more computing devices 112 may communicate with a central training unit 116. Each computing device 112a, 112b, 112n may be a computer-based system with sufficient connectively to the link, computing power and memory to store and execute the user interface portion and game logic (or some portion thereof) or sufficient connectively to the link, computing power and memory to execute a browser application that can permit the user to interact with web pages containing the training communicated to the computing device (when the user interface portion and game logic are executed by the central computer) Each computing device may be, for example, a laptop computer, tablet computer, handheld computer, pocket PC, PDA, wireless email device, mobile phone and the like. In a preferred embodiment, the central training unit 116 may be one or more server computers. In a preferred embodiment of the invention, the computing devices communicate with the central training unit over a wireless network, but may also communicate over any other known communications path such as a cellular network, wired computer network such as a local area network or a wide area network or a wireless computer network so that the invention is not limited to any particular type of communications path. The computing device may have similar components to those shown in FIG. 1. The central training unit 116 may be coupled to a storage unit 118 that stores the data and information for the training system.

In this networked environment, the user interface portion 40 and game logic 42 may be stored and executed on each computing device 112 wherein the results are communicated to the main training unit. In some embodiments, the main training unit may communicate other training modules to each computing device. Alternatively, the user interface portion 40 and game logic 42 may be stored in the data storage unit 118 and may be executed by the central training unit 116 that generates each training/problem/challenge and communicates the training exercise, such as by a web page, to each computing device that displays the training exercise, such as by using a browser application, so that the user of each computing device interacts with the training and the user's responses are communicated back to the central training unit 116 that then determines how (if at all) to adjust the training as described above.

As shown in FIGS. 1 and 5, the system is available on a variety of delivery platforms, including an application service provider (ASP) platform and a local area network/wide area network (LAN/WAN) platforms both of which are described above with reference in FIG. 5. The training system also, at any time that a LAN/WAN customer wishes to convert over to the ASP version of the program, permits the LAN/WAN databases that are on servers all over the country to be virtually and seamlessly integrated into the then-current database used in the main ASP version of the program so that conversion between the platforms is more easily accomplished.

In addition, various different people may use the system including students and other individuals who may wish to evaluate or impact the instruction of one or more students, as well as individuals who may wish to view reports based on student, class, grade, school, region, district, etc. Accordingly, in accordance with the invention, the "users" of the system may include students, teachers, education specialists (like reading specialists and special education teachers), school principals, district administrators, district superintendents, technical administrators, parents, etc.

Figure 6:
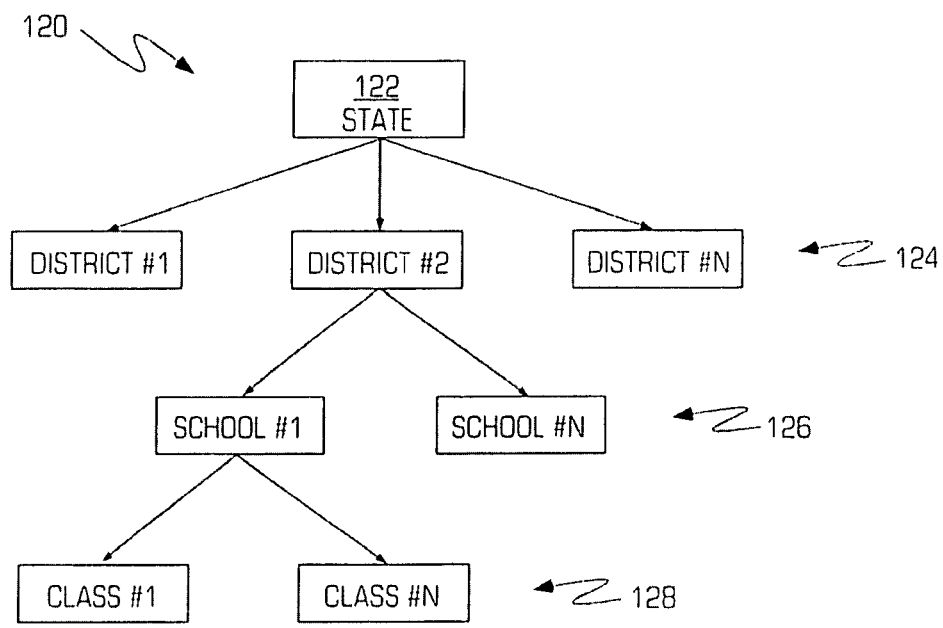
FIG. 6 illustrates an example of a hierarchy of users of a networked computer training system.

In accordance with the invention, the users of the system may be organized in a hierarchy for the training system. An example of a hierarchy for a training system installed at a state educational agency is shown in FIG. 6. The system may have a hierarchy 120 that has one or more levels of granularity. The example of the hierarchy for the state educational agency shown in FIG. 6, the hierarchy may include a state level 122 (at the top of this exemplary hierarchy), a district level 124, a school level 126 and a class level 128. The hierarchy permits the system to categorize users of the system based on their level in the hierarchy and therefore be able to parse and report data appropriately and accurately. In general, each hierarchy for each installation of the training system is going to be unique since, in the example shown in FIG. 6, the number of schools, the names of the schools, regions, districts, etc will likely be unique for each installation. The hierarchy will permit, among other things, for the system to provide proper roll-up reports at various levels of the hierarchy and for the particular districts, schools, etc. that are part of the particular hierarchy. The hierarchy also permits the training system to properly determine the permissions of a particular user based on the level of the user in the hierarchy. For example, the principal of one school should not have access to the data generated at another school, whereas the superintendent of the district may wish to have access to data generated anywhere within his or her district. Unlike typical systems, the training system may be shipped to a customer with the hierarchy pre-built and loaded into the system to make the integration and installation process easier for the customer. The training system may also be populated with the names of all the applicable districts, regions, schools and other data applicable to the customer. Not only does it greatly reduce the burden imposed on the customer, but it permits the customer and other appropriate users to create and view reports that accurately roll-up to all the different possible levels within the public school system, private school systems (e.g., Catholic and other parochial schools), BIA schools, etc.; while ensuring that each user has access limited to their appropriate permissions as determined by their level of seniority in the hierarchy.

In addition to the language micro-variable instruction set forth above, the training system may further comprise questioning comprehension, mass customized homework, instructional efficiency, a vocabulary selection method, vocabulary instruction, a method for vocabulary inferred meaning, built-in instruction and review, varying the amount of text in the questions, race consciousness support, English as a second language support, idiom training, phonics meta-intelligence, fluency test construction, recorded fluency dialog, a unique scoring method, doze sentence training, a typing interface, an assessment methodology and high frequency phrases training, each of which is described in more detail below.

Figure 7:
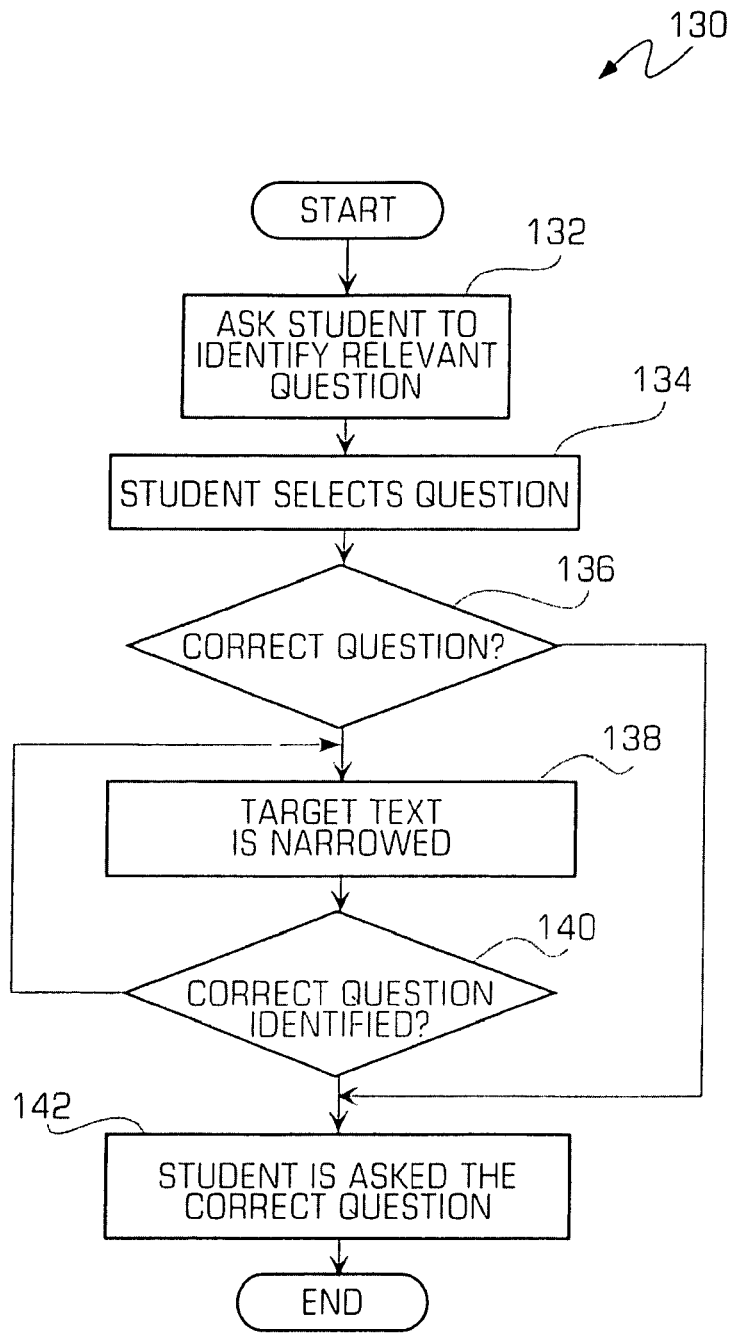
FIG. 7 illustrates a method for question comprehension of the training system.

FIG. 7 illustrates a method 130 for question comprehension of the training system. The ability to generate a question while reading is an important comprehension strategy since a good reader, while reading, will often summarize for themselves what they have just read. In part, the good reader accomplishes this by asking themselves questions about what they have read and the answering the questions. For good readers, this process of framing questions and then answering them is often done seamlessly, such that the formulation of the questions is subsumed by the answer/summary experience. For a good reader, there is often not much conscious attention on asking themselves, "How do I know what question to ask myself?" The answers that good readers generate while reading provides an ongoing summary of what is going on in the reading, which is the foundation upon which additional comprehension is built as reading proceeds. However, before struggling readers can even reasonably be expected to learn how to summarize during reading, they must first learn how to frame the questions that they should ask themselves with respect to specific texts. It is important for these students to learn how to know what questions they should be asking themselves, how to identify appropriate and important questions in relation to the material being read.

To facilitate this learning of the questioning process, the training system may include a module, preferably implemented as a piece of software code, that implements the method for questioning as a comprehension strategy shown in FIG. 7. Thus, in step 132, while the student is reading a particular portion of text, the training system presents a student with a question, such as "What question is a good question to ask here?", that asks the student to identify what would be a good question to ask him or herself (in step 134) in relation to that particular portion of the text (such as "Who is this passage about?" or "When did this happen?", etc.) wherein the correct answer to the good question provides a best summary of the particular portion of the text. The training system may provide the student with one or more different questions from which to select the best question. In step 136, the training system determines if the student has chosen the correct question. If the student has selected the correct question, then the method goes to step 142 in which the student is then asked to provide a response to the correct question selected by the user which causes the student to summarize the particular portion of text.

In certain applications of this activity, if the student does not select the correct question, the training system may narrow the target text. In particular, the student is directed back to the particular portion of text and the attention of the student is focused on a smaller portion of the particular text. The student is then asked to select the correct question and the training system determines if the student selects the correct question in step 140. If the user selects the correct question, then the training system goes to step 142 as described above. If not the text is again narrowed (with the key text highlighted this time) and the student is again asked to identify the correct question. If the student still cannot identify the correct question, the training system provides the correct question to the student. In this process, students are taught not only how to summarize while reading, but also how to determine, based on the text being read, what are appropriate questions to ask themselves. The proper formulation of appropriate questions are a prerequisite to teaching a struggling reader how to independently begin to summarize information while reading.

The automated process in the system described above is employed in a variety of contexts in the system. In many circumstances, a student is presented some type of challenge; it may be in the questioning context described above, or in a variety of other contexts. In any case, these challenges will relate in some fashion to a text or a portion of a text. Typically, the answer to the challenge is contained in a portion of the text or can be derived from a portion of the text. If a student is presented with a challenge, the system may return the student to the text, with a portion of the text highlighted or otherwise called out. The highlighted (or otherwise called-out) text contains relevant information (e.g., the answer to the challenge). It serves as a clue to help direct the student's attention to the relevant text to review or search. If the student requires more help, (for example, still responds incorrectly), the system can again return the student to the text, but this time highlighting an even smaller portion of the text. This process can continue one, two or any number of times, progressively calling out smaller and smaller sections of text, thereby focusing more and more closely on the exact text that provides the clue or answer. Ultimately, only the correct answer contained in the text may be highlighted. This text may also be accompanied by supporting information (textual, audio or other) explaining why the highlighted text was the appropriate text for the student to have identified.

Similarly, this process is also used in the context of correct answers. For example, where a student is challenged to make an inference from the text and does so correctly, he/she may be returned to the text with a portion highlighted, and instructed to click on the text that provided him or her with the clues necessary for him/her to have made the correct inference.

Now, the mass customized homework of the training system is described in more detail.

The training system may permit a teacher to automatically generate mass-customized homework sheets for each student. The mass-customized homework sheets may be generated for all types of training/instruction (vocabulary training, phonics training, comprehension instruction, fluency instruction, high-frequency words instruction, high-frequency phrases instruction, etc.) that is provided by the training system so that each training module (that may preferably be a piece of software code) may include the function of generating the mass-customized homework sheets. To illustrate this mass-customized homework sheets of the training system, an example of the mass-customized homework sheets for vocabulary training is provided. The training system is aware that every student (at an installation in an elementary school, for example) must do vocabulary training, but that each student may be working on a different set of vocabulary words, based on his or her own ability, placement and progress. Moreover, even within the same lists of vocabulary words, the training system tracks which of these words each student has "mastered" and which words the student has not yet "mastered." Thus, in many cases, even within the same lists of words, students will be focusing on different words within that list. The details of the mass customization process is described in more detail in U.S. patent application Ser. No. 11/347,425 filed on Feb. 2, 2006 and entitled "On-Task Learning System and Method" which is incorporated herein by reference.

Since the training system has information on each student and his/her level of each type of training, such as vocabulary, the training system allows the teacher to print out a particular homework assignment for all students with each student's specific homework being unique. In this case, for example, the teacher may print out a sheet for each student with the same assignment to go home and write a sentence using each of the vocabulary words on the sheet. However, every student's sheet is unique to that student based on the variables described above so that the assignment sheet has a unique set of words for each student. Thus, all students can have the same homework assignment, yet it may be that no two sheets are identical as each sheet has been customized for the specific instruction appropriate for that individual students at that very point in time. Now, the instructional efficiency of the training system is described in more detail.

The training system may provide training and instructions that increases a student's time-on-task. The training system increases the time-on-task of the student by finding more time for instruction and practice (e.g., extending learning into the home), substituting time (e.g., reducing instructional time in one area where there is little need and increasing instructional time in another where the need is greater) or improving the efficiency of the time already being spent on this topic. The training system ensures that the student is working on the areas of instruction that he/she needs (e.g., accurate assessment and placement), and is getting maximum efficiency/return from the time he spends in the program (granularity and/or real-time instructional adjustment during learning). As with the mass-customized homework, the time-on-task functions of the training system may be used with all of the training/instructions of the training system. For purposes of illustration, an example for vocabulary training is described.

For vocabulary training, the student is placed in the vocabulary training based on the results of certain, targeted instruction. Based on that placement, certain additional assessments are used to determine whether there are any gaps that require antecedent remediation prior to the student's placement in the overall remediation program. However, once the student is finally placed and program instruction begins, an entire other layer of methods to maximize time-on-task of the student is employed. In particular, for each unit of the training, the student's mastery of the words for that individual unit are evaluated and, once instruction begins, the student's responses are tracked on a word-by-word basis. Then, either as a result of the unit assessment or as a result of the student's responses demonstrating "mastery" for an individual word, each such "mastered" word is taken off the "instructional" list (of the particular words for the particular student) and moved to the "mastered word" list so that the training system is continuously adjusting the training provided to ensure that the training is customized to each student. During the vocabulary training, the training system draws from the instructional list (of words for the vocabulary training) to ensure that the student is primarily spending his efforts on words he does not know.

To further the time-on-task training, the training system ensures that the student, once the student has mastered a word, continue to be accountable for retaining knowledge of that mastered word. Accordingly, while the training system instruction draws primarily from the instructional pool, it will simultaneously mix in words randomly from the mastered word list, but at a significantly lower rate per word than for the words in the instructional word pool. In this manner, the program is not only targeting the student's time and attention on the specific vocabulary instruction that the student needs the most, such individualization and customization occurs in real time, matching immediately to the learning that is going on in that instant. At the same time, the training system instruction provides subtle ongoing review and accountability for material that the student has already mastered, to ensure that this knowledge is retained and applied. If at any time, one of the randomly-selected mastered words is mixed into the instructional list and is missed, that word is retained in the very next cycle as one of the review/mastered words. If that mastered word is missed a second time in a row, it is removed from the mastered list and placed back into the instructional pool, until such time as mastery is demonstrated again for that word. Now, a method for vocabulary selection of the training system is described in more detail.

The training system in accordance with the invention may include a novel method for selecting the vocabulary words used by the training system. Typically, instructional programs select vocabulary words by one or two different methodologies including: 1) creating text or repurpose existing texts for use in the program and then review the texts for words that someone thinks will be interesting to the target student and use those words; or 2) the programs will refer to other materials that reflect the grade levels that words are typically taught to students by the large education publishers. The problem with this second approach is that it is fundamentally the same as the first approach. The large education publishers have generally employed the same subjective criterion for what words to teach when. A consensus is then built as each subsequent publisher relies on the judgments of each other publisher. The fundamental flaw in these two approaches is that a student's knowledge of one word does not provide meaningful information that would allow one to extrapolate whether a student knows any other given word. For example, if one determines that a student knows the word "garage", it provides no reasonable basis for determining whether that student also knows the word "loft." In fact, from a phonics development perspective, the word "loft" is easier to decode, yet the word "loft" may very well be less likely to have made it into a student's vocabulary than the word "garage". On the other hand, if a student does know the word "loft," on what basis can one assume that this student knows the word "garage"?

In the training system, a different approach for selecting the vocabulary words is used. In particular, in developing this system, studies of word frequencies in the English language were reviewed and evaluated. Specific words were identified and grouped according to language acquisition and instructional patterns. Through this process, word-frequency bands were developed for each grade level and for ranges within each grade level. During this process, the frequency variations among these word bands were found to be statistically significant. In the end, word frequency bands were developed for each grade level and for ranges within each grade level. English language words were then grouped into these bands according to the frequency with which they occur in the English language.

For example, words that typically occur in the language of second graders typically have a word frequency value (SFI) of between 57.99 and 54; third grade SFI is from 53.99 to 50.0; fourth grade SFI is from 49.99 to 48; and fifth grade SFI is from 47.99 to 46. Note, that the second grade band was truncated at the top end of the SFI to prevent words that were "too frequent" (that is, too easy) from being included in the instructional pool. (Note, the pool was further scrubbed to separate out things like proper nouns, peoples' names, etc.)

Next, these words were screened for utility. It is important to know not only what words might be appropriate at a certain grade level (based on frequency), but—especially for struggling students—it is desirable to know what words are useful. Given two words of the same frequency rate, it was deemed that the word that could be used in more settings, in many different contexts, was more useful that the word that was equally frequent, but could be used in fewer contexts.

In previous studies, words have been evaluated for how limited or broad is their use in language. That is to say, some words are narrow in their use (e.g., "election" might be useful primarily in discussions about governance) while other words may be broad in their use (e.g., "balance" might occur across diverse areas of interest—science, history, math, current events). This measure of "pervasiveness" ranges in value from 0 to 1.0, with the higher numbers being more broadly applicable, or more pervasive.

This research was then applied to the words previously organized into the grade-leveled frequency word bands described above. Only words with a "pervasiveness" value of 0.6 or greater were retained.

As a result, an instructional word pool containing thousands of words was developed that selected words for usefulness, and organized them according to frequency bands tied to appropriate grade-levels for instruction. These words were then incorporated into the texts as they were being created (rather than identified in texts post-hoc after they already existed).

As a result of this novel process for selecting the vocabulary words, the training system can make reasoned judgments and extrapolations about and from words. In other words, if a student already knows the word "garage" and several other words that occur in language at the same frequency as the word "garage," we can now gauge how much language exposure this student has had; and it stands to reason that other words that are comparably pervasive and equally frequent in language are likely also known by that student. It would then be appropriate to move the student up to the next set of words that occur slightly less frequently in the English language and evaluate (and if appropriate instruct) that student on these slightly less frequent words.

A similar approach has been implemented for Morphology instruction, another aspect of Vocabulary instruction in the system. While certain programs provide morphology instruction, no discernable methodology can be identified for the process by which the morphemes were selected. It appears that the process is typically similar to the way many programs identify words for Vocabulary instruction. In contrast, this system reflects additional research about the English language; namely, 29 prefixes make up 97% of the all the prefixes used in English (based on numbers of words that have prefixes, and number that have these particular prefixes as drawn out of a corpus of more than 5 million words). Moreover, 20 suffixes account for 93% of all words that have suffixes in English. Accordingly, this frequency data has been used to develop the compilation of appropriate morphological units about which to provide instruction.

One particular process for Morphology instruction in the program presents a student with a word. The student is directed to consider the word and identify any one or more recognizable morphemes, and then divide the word into its morphological components. The student is then tasked with identifying the meaning of the one or more morphological components of the word. (If certain of the morphological units is not a subject of the instruction, the meaning of those units may be provided to the student.) Based on the meanings of the component morphemes that the student has identified, the student is then challenged to make a reasoned judgment on what the word itself likely means.

In the case of vocabulary training, struggling readers often develop a variety of compensatory strategies. In the context of Vocabulary programs, one strategy is for the student to match definitions to their corresponding target (or vocabulary) word by matching key words of the definition to the target word, rather than actually understanding/knowing the meaning of the word. For example, the word "ecstatic" might have the definition of "very, very happy". Rather than learning what the meaning of "ecstatic" is, a student might simply remember that the word "ecstatic" goes with the definition that has "very very" in it., To prevent this compensation strategy and encourage the student to focus on the meaning of the word, the training system may have multiple versions of each definition of a vocabulary word wherein a single definition is stated in multiple ways using different words in the definition. For example, the word "ecstatic" might have the definition of "very, very happy" and "state of rapture" which are two different expressions of the same definitions (compare two different definitions for the word "bank"—place to keep money vs. edge of a river). (Note, the program, under other conditions—e.g., the teaching of words with multiple meanings—may also provide multiple definitions of a word, like "bank".) The student might be presented with one version of the definition at certain times when learning the new word, and may be presented with other expressions of the same definition at other times. Moreover, yet another expression of the definition might be used on final assessments. In this way, the student will not be able to get the correct answers simply by matching key words in the definition to the target word, but rather will have to associate the meaning of the definition to the target word.

The training system may also provide the student with a methodical, step-by-step process for tackling unfamiliar words. A number of existing programs tell students that inferring meaning is important—look at other, known words that might help you guess the meaning of the unknown word—but do not provide a systematic approach to handling the unknown words. The training system (at skill-appropriate levels), teaches students that they should (i) consider what the passage is about, (ii) look for other, known words that might provide a clue about the unknown word, (iii) look at the word itself for (morphological) clues and (iv) consider the subjective or connotative aspects of the passage. It is important that the student come to understand that this step-by-step strategy needs to be applied flexibly, and that all four of these steps won't always help. Accordingly, the training system is designed such that, on occasion, the strategy the student is invited to employ will be only partially effective, and sometimes may not work at all. Sometimes strategies, even in properly employed, are ineffective. The training system may provide the student with training of this methodology as well as how to use the methodology since it may not work each time and the student needs to be aware that the methodology does not always work.

The training system may also have a unique training structure that includes instruction with built-in, in-unit reviews, as well as reviews that automatically integrate content from across multiple units. For example, the training system may include training for one or more grade levels (2nd, 3rd, 4th and 5th grade level for example) with each grade level containing the same number of themes (such as six themes) wherein each of the themes in each grade has its own grade-appropriate sub-theme. For example, if the theme is "Nature", the 2nd grade subtheme might be "Rainforests" while the 3rd grade subtheme might be "Endangered Animals" and the 4th grade subtheme might be "Natural Disasters", such as tornados. Each subtheme for each grade level has a video relating to that sub-theme and four training units. Each training unit contains a passage that ties to the sub-theme associated with the particular unit. In the preferred embodiment, the first three passages of the subtheme (the $1^{st}$ three units) are all instructional and present new, instructional information to the student. Each unit also contains built-in review to reaffirm and re-enforce the mastery achieved within those units. In addition to the in-unit review and re-enforcement that the training contains, the fourth unit of each subtheme is dedicated to providing review and re-enforcement of the content the student has mastered in the previous three units. This training structure ensures that students demonstrate mastery of mastered content, and that this demonstrated mastery occur on multiple occasions, and over time so that the mastery of the content does not fade. In order to avoid repeating known items for a student, the training may also contain "early advancement review triggers," so that within units and across units, a student who has demonstrated exceptionally high or robust levels of mastery will be asked to spend less time on review and re-enforcement, and in fact, under certain conditions, can skip the review units altogether.

Each unit in the training structure above may have multiple levels of difficulty and a user/student has to show mastery at the hardest level to complete each unit. Each level may include iterations of training that must be completed. As described above with reference to FIGS. 4A and 4B, the user/student can do well on a level and move up a level, do poorly on a level and move down a level or do average on a level and repeat the level so that the training adjusts to the user's skills. To encourage the completion of a level and/or a unit, the training system awards bonus/completion points to complete a level and its iterations, bonus/completion points when the level is increased and unit completion points when a unit is completed. The user/student is made aware of these bonus/completion points in order to provide the user/student with additional motivation to complete the levels and units wherein the points can be converted into gems as described below in more detail.

The training system may also vary the amount of text in each question since one of the ways students improve reading skills is to have more practice reading. Aside from the texts the students are asked to read, by controlling and varying (gradually increasing) the amount of text in each of the questions, the student is subtly being given more reading practice, and the reading of the questions themselves becomes part of the adaptive reading instruction. Moreover, some students may experience lower levels of motivation while reading text passages. It is not evident that any particular segment of text will be relevant to their ability to score well on the questions related to that text. In contrast, students may experience higher levels of motivation to read and understand the text in the questions themselves, as it is clear that understanding this text will be critical to the student's ability to successfully answer that question. Accordingly, the training system makes use of the potentially higher student motivation and uses the questions themselves to subtly provide students additional reading practice.

The training system may also provide positive racial images to the students training with the system since there have been studies that indicate that, for members of certain racial groups in the United States, such individuals will tend to perform better or worse in testing environments based on subtle messages suggesting negative assumptions or stereotypes, or even settings that simply remind the student of race (given the many issues that race implicates in America and many other countries). For example, a form that simply asks a student to indicate the racial group of which he/she is a member can lead to poorer performance by African American students. Accordingly, the training system may employ certain techniques to turn this research to the benefit of the student, namely to present positive racial images and to remind the student of his or her sense of pride, competence, history, heritage and confidence that can be drawn from his ethnic and racial heritage. For example, before each training unit, a student can select a short snippet reminding that student of recent and historical achievements of people that are ethnically or racially similar to the student.

The training system may also permit the teacher to indicate whether a student is an English Language Learner (ELL), and—if so—what language is the student's home language. Based on these (and in some cases, some additional variables), the training system may automatically adapt all of the starting levels of each of the activities to provide additional supports, alternative flows, and modified instructional templates, all designed specifically to support the needs of an ELL student. The training system may also adapt the training based on knowledge that people with a non-English home language (such as Spanish) might have difficulty with particular sounds in the English language (e.g., differentiating /d/ from /th/).

Another instructional progression that is particularly helpful for certain ELL students is as follows: (i) showing a word, with a picture of that word right underneath it, and an audio pronunciation of the word available upon clicking on the image; (ii) scrambling the word and the image/audio so that they are no longer aligned, and the student must match them (matching text and image/audio); (iii) the same as "(ii)" above, except that no audio is available—scrambled images and words only (matching text and image); and (iv) replacing the image with a written definition, so that the student is required to match the word to the appropriate definition (matching text-to-text). Also, a step or steps may be added where the image and the textual definition are matched and/or scrambled.

If a student is identified in the system as an ELL student, the system may automatically customize the flow/order of the instructional training, the content offered to the student (as described above), and the supports available to the student (for example, audio supports may be available to the student in both English and in his or her home language), etc.

The training system may provide idiom instruction to the student. The idiom instruction may include an "idiom history" support, that provides an historical or logical explanation to help the student remember the meaning that the particular idiom is intended to communicate. For example, the idioms "bought the farm" means that someone died. Its origin comes from the fact that, during WWI, when a soldier died the government would provide the soldier's family with enough money to buy a farm. These historical origins of idioms, as well as other mnemonic devices for remembering their meaning, will be integrated into the idiom instruction.

The training system may also provide phonics meta-intelligence. In particular, the errors that a student makes in reading and/or spelling provides an indication of the phonics rules that the student has not mastered. However, other patterns in these phonics errors can be identified to provide deeper insights into patterns among these patterns. Accordingly, certain combinations of error patterns can be analyzed and evaluated, and used to conclude that the student may be struggling not because of a failure of a particular phonics rule; but rather, because that student is likely familiar with the sounds of another language or language pattern. Accordingly, these meta-pattern analyses can be used to adjust the learning path, and the instructional targets and foils to tailor the training/instruction to a particular student who is demonstrating confusions typical of students who, for example, are more familiar with the sounds of the Spanish language than with the sounds of English. Accordingly, a specific sorting activity may now be presented to this student that he/she would not have previously seen. However, more importantly, the training system knows that certain target/foil combinations are more critically important for these students, so (in the case of a Spanish language sound pattern) the student will be contrasting /d/ and /th/ sounds, or letters "e" and "a"—as these are sounds and letters often confused by such students. Similarly, these intelligence can be used to identify and intervene in a similarly customized fashion for students who may come from a home where African American Vernacular English (AAVE) is spoken; similarly, certain letters and sounds are typically confused, switched or substituted in such cases.

Accordingly, not only is the instruction modified/individualized to target more heavily the areas of instruction that the child is struggling with, but the program can further modify the instruction for the student to provide instruction in areas where the student has not yet shown deficits but that tend to be highly correlated with the types of errors that student has already made.

The training system also permits the student to construct his own fluency texts. One of the ways to get a student engaged in a text is for that student to have a sense of investment in the text. One way that the training system has developed to help create student investment is to permit the student to essentially "create" the text himself. Although it is desirable for a student to create a text, it is often a challenge for a struggling student to write a text at all, much less come to feel connected to that text. Moreover, under certain circumstances, it is desirable to control the themes of a text or words used in a text to ensure that the works remain appropriate for the educational setting and age group. In addition, it is also difficult to have a student create a text because to do so often requires the student to type a text which imposes additional hurdles and distractions. To assist the student in creating text, the training system presents the student with pre-existing texts, songs, poems and the like. These texts can be pre-assembled, partially assembled, or completely dissassembled in, for example, a bank of stanzas, sentences or other chunks of text. Each of these items has corresponding fluent-reading audio associated with it. This program enables the student to re-arrange phrases, clauses, sentences, stanzas, etc to create his own unique, custom, individualized text of his own creation. And, after having re-arranged/"re-written" a passage, the audio files associated with each portion of text are maintained so that, once the passage has been created, the student can actually hear a reading of the new text he has created. This fluent reading audio then provides a model for the student, as he practices reading fluently his own creation.

The training system may also train the student with recorded fluency dialog wherein some of the texts that are part of the training system may be in the form of dialogs, interviews, skits, etc. with two or more readers. The training system provides the student with a model reading of the dialog and, when the student is ready, the student reads the roles of one of the speakers while the training system provides the readings of the other characters. The training system may use a microphone that is part of the computer system so that the user can record himself in one of the roles and, after he has recorded himself, he can listen to his reading with the computer-delivered dialog integrated into the recorded dialog. The student thereby can listen to his own recording in the context of the multi-person dialog and compare pacing, flow, etc. In the meantime, another student may be doing the same thing, but playing the other role in the dialog. The training permits each student to practice and rehearse the dialog in private and then, when both of the students are sufficiently comfortable and prepared, they can perform the dialog with each other, in front of the teacher or other classmates to give the students some training in public speaking In determining a student's target Fluency rate, it desirable to know at what point in the school year the student is then in. A student's target fluency rate typically is lowest in the fall, rising through the winter, and is highest at the end of the school year, in the spring. However, typically the target rate for the student is lower at the beginning of the next school year than it was at the end of the previous school year, as most students decrease in fluency rate over the summer break. In the case of a struggling student, who may be in the fourth grade, for example, who reads at 65 Words Per Minute (WPM), it is difficult to know whether the student is reading at a typical middle-second-grade level or a typical early-third-grade level since the target rate for both is 65 WPM. However, if one knows the time of year that the student achieved that rate, then the determination is facilitated. The training system identifies the time of year that the student achieved that rate, automatically matches the rate and calculations, and can provide a grade-level equivalency score. The determination is even more greatly complicated, however, if the student does not happen to score a rate that is identical to one of the target rates, but is somewhere on the sliding scale between those rates. A sliding scale matching every possible score at every time of year has been constructed, so that the training system can automatically make the appropriate rate/time of year calculations for each reading.

The training system may provide highlighted pacing for fluency practice. The highlighting moves along the text, providing pacing for the student. The student practices his or her reading, gradually working his or her fluency rate up to match the rate of the pacer. Of note, however, is that—for each student target rate (which varies according to target skill level)—the pacer is available at three different rates that the student can select, so the student can adjust the rate as he or she is working up toward, and past, the target rate at his or her next-applicable goal.

The training system may include a scoring method that ensures that the student's time and effort is being used efficiently and appropriately and includes certain early-evaluation points. Most training has identified certain performance criteria as instructional levels, mastery levels and frustration levels. However, there is a risk that a student will be working at a level that is much too easy or way too hard for him, yet the training will not be able to determine this fact until a round has been completed and a score calculated. To avoid this problem, the training system has built in "early bail-out triggers", "early regression" triggers and "early acceleration" triggers. So, for example, if very early in an instructional cycle, a student is scoring very, very poorly and hits the "early bail-out trigger", the instructional activities will be stopped, the student will be returned to the instructional/teaching area where he will again be presented with the teaching portion of the unit, and then the student will again begin the instructional activities. When the student reaches again the "early bail-out trigger" spot in the cycle and his performance has not materially improved, the instructional activities will again be stopped and the student will be relocated to an easier/more supported level of activity. Then, later in the instructional flow (assuming the student has made it past the early bail-out point), the training system may again do an early check at the "early regression trigger." If the student's performance has in fact improved enough to pass the early bail-out trigger, but not enough to make it past the early regression trigger and continue through the whole cycle, then the student will be relocated to an easier/more supported level of activity. Also, at this point, the training system will check for early exceptional performance, so will also serve as the early acceleration trigger. If, for example, the student has scored 99% correct up to that point, the student will be accelerated to the next level immediately, rather than have the student complete the entire cycle at a level that is much too easy for him. Thus, the training system continuously adjusts the training provided to each student based on each student's scores during the training. In addition, the training system may evaluate the student's progress based on accuracy/correctness of answers, but also on consistency so that a student must not only demonstrate mastery (that is, a "passing" score), but he must demonstrate it on multiple occasions during different sessions indicating that the student has learned the concept and not just maintained it in short term memory.

The training system also may assign variable points for a correct answer, with more important questions (that is, questions that are more directly related to the skill or strategy being taught) receiving more points, and less important questions receiving fewer points. This weighting system permits the training program to provide more and more diverse approaches to instruction for the student, without having the student's performance/mastery scores being too heavily influenced away from the most telling areas of student response.

Moreover, the points system may also be weighted to permit the student to receive more points on the first attempt, and fewer and then fewer points for subsequent attempts. Additional bonus points may be allocated to a student for correct answers on a first attempt at a first round or level of play.

Under certain conditions, points for a certain response level can be earned only once. For example, if a student earned 0.5 points for a correct response that was his third attempt, he may see that question again in a subsequent round. However, having already earned 0.5 points for a third-attempt correct answer, if he answered the question correctly in a subsequent round on the third attempt, no further points would be awarded. However, if he answered the challenge correctly on his first attempt in a subsequent round, for that response he would still earn the full (for example) 2.0 points that one receives for a correct answer to that question on a first attempt.

The training system may also include doze sentences (a sentence is presented to the student wherein the sentence has a blank space in it and the student is supposed to identify the word that is the best choice to fill in the blank) training. In the training system, all of the words that are presented as possibly being inserted into the blank will make sense in that sentence so that it is impossible to determine which is the best word to use in that sentence only from reading and understanding that sentence. Rather, the student must read and understand the entire paragraph in order to determine which word is the correct choice, as only one word will be appropriate given the content contained or implied in the paragraph as a whole.

The training system may also provide a typing interface for training that requires typing (which may be turned off by the teacher.) Many students will not be proficient with a keyboard so that the training system provides an option for an onscreen keyboard where the virtual keys are shown in alphabetical (rather than QWERTY) order, making the letters easier for students to locate quickly.

At each unit of instruction there are multiple levels of training offering different levels of instructional support. A student typically starts at level 1 unless a different setting has been established for the student. Level 1 provides a moderate level of support, typically including audio supports, embedded links, definitions and other supports. If the student's performance is below the appropriate instructional level, the student will be bumped down to a lower level (e.g., Level −1), where more supports are offered, making the initial learning process of the same material easier. For example, at Level −1, the program's responses to the student's answers are typically "Snap-Back" responses. Snap-Back response means that the student receives immediate feedback after each individual response, and in fact—in the case of dragging an answer to an incorrect location—the incorrectly dragged response will immediately "snap-back" to its original position. While the response will register to the system as an incorrect answer, the dragged item will not be accepted in that space, and the student will immediately be invited to try another choice. In contrast, at a higher level (Level 1), responses become "Batch" responses. In other words, the level of challenge is increased because the student puts forth all of his responses to the applicable challenge(s), and when he is ready he "submits" his choices. Only then does the program evaluate and respond to the student's choices—again providing immediate feedback but to the batch of answers (and perhaps still offering the student another chance to respond to the missed items). Higher levels of training include additional increased challenges, offering little support and adding time challenges, thereby requiring the student to demonstrate independent mastery, often under timed conditions.

Other variables that are controlled in order to manage difficulty at various levels include (i) the number of questions presented at a time (ranging from only one question to many), (ii) the amount of time the student has to respond, (iii) the number of tries the student is permitted to have to correctly answer a question, and (iv) embedded textual supports (such as links to definitions, sample uses, translations, etc).

The training system may provide many levels of assessment wherein these assessments are used to place a student, identify particular areas of weakness, establish remediation and instructional paths, provide ongoing progress monitoring, etc. While assessment is important, it also is important not to perform excessive assessment on students, particularly students who are reluctant, struggling and failing readers since they already have challenges with motivation, self-esteem, self-image, etc and assessment identifies the relevant points of failure of the student. In order to provide appropriate assessment without demoralizing a student, the training system at certain levels of assessment asks the student which words (in the example of vocabulary training) that the student wishes to be tested on wherein the student is shown the words and is invited to indicate which words he thinks he already knows. Then, if none are marked by the student, no assessment will be delivered. If he indicates that he already knows two of the words, then only the student's knowledge of those two words will be tested. This method means that the student is determining what level of assessment is appropriate for him and, the assessment, if any, that is then delivered is being delivered at his suggestion; and he has a reasonable chance of having an assessment that in fact he can perform well on. This method not only empowers the student and increases motivation, but it also prompts the student to ask himself "What do I know already?" Many reluctant readers know more than they think they do, but often fail to access this knowledge. This process of asking themselves what information they already know is itself beneficial training. Finally, this process enables the system to quickly determine the extent to which the student's sense of what he knows actually matches his demonstrated knowledge (in either direction).

Through an initial reading comprehension assessment and placement function, the system may place a student at an appropriate starting level in the program. Additional assessments are used to determine whether the student has any gaps in core knowledge at levels earlier than the reading level at which he has just been placed. While a student's reading comprehension may be at a certain level, that student's mastery of particular reading-related skills may be at a lower level, or have meaningful gaps in them. For example, a student may be placed at the third grade reading level, but the program may determine that there are still some key second-grade phonics skills where the student is deficient. The system's assessments are specifically linked to the system's instructional scope and sequence, such that if any particular gaps are identified through these assessments, the program will automatically generate a remediation program for that student, comprised of a remedial path linking only those aspects of earlier instructional units that the assessment indicates are student deficiencies. Once this path is complete, then the student will move forward with instructional units starting at the reading comprehension level at which he was placed.

The training system may also provide high frequency phase training Research has shown that the first 50-100 high frequency words may account for as much as one-third of all the words an elementary student may read in print, and some say that roughly 50% of all such text is comprised of the first roughly 100-200 most frequent words. Accordingly, it is important for students to become familiar with and readily recognize the most frequent words in the English language. (Some existing programs teach 100-200 of the most frequent words while the training system provides training for the 500 most frequent words in the English language.) Some existing systems allege that they train students in the area of high frequency phrases, but these phrases are really only phrases that have been constructed out of the lists of high-frequency words described above. The odds that many—if any—of these phrases actually occur frequently in the English language is remote at best.

The training system, however, has applied select research from a relatively new area of study known as Phraseology in which n-gram phrases (an n-gram is a phrase comprised of "n" words) that occur most frequently in the English language have been identified. The training system has taken n-grams ranging from three to six words in length, ranked them in order of frequency and filtered them for grade-level appropriateness. Accordingly, all of the high-frequency phrases in this program are in fact phrases that occur frequently in natural, English language, that students are likely to encounter, and are presented according to their frequency values and complexity (in terms of length and word choice). Thus, the training system provides the student with actual high frequency phrase training with phrases that actually are high-frequency phrases (not phrases artificially constructed for the program from high-frequency words).

The training system and method described above may also provide the user/student with incentives for being engaged in the training so that, even if the student/user does not answer questions correctly, the student/user stills receives positive feedback from the training system. The positive feedback may include awards and accolades. In one embodiment, the training system may include tiered points system in which the user/student may receive a number of points (for example 10 points) for being engaged, but not providing the correct answer, a higher number of points (for example 20 points) for providing the correct answer but not on the first attempt and a higher number of points (for example 30 points) for providing the correct answer on the first attempt. In this manner, the training system provides some positive feedback for a user/student even when the user/student may be unable to correctly answer questions. The training system may further include a rate of point inflation/deflation that can be adjusted as items that can be purchased change or evolve. For example, the training system can increase/decrease the point value evenly across the points system (how many points a user receives for each activity), the system can increase/decrease the number of points it takes to convert into a gem (gem purchase inflation/deflation) and/or the system can change the number of points for an individual activity/group of activities/exercises compared to the other exercises having the same rate of change (so that some activities become more/less valuable relative to the other activities.

In addition to the points system described above, the training system may provide the points for positive feedback, but then also permit the user to convert a predetermined number of points into gems wherein the gems are more difficult to obtain than the points. In one embodiment, each user/student may have strict gem conversion rules so that it is more difficult for each user/student to acquire the gems that can be used to purchase items for an avatar as described below in more detail. Thus, the items that can be purchased with the gems are motivational for the user/student since the gems are harder to acquire. In addition to the avatar items described below, the gems can also be used to purchase real world items (such as music or books or clothes) or coupons (such as a coupon to Barnes & Noble or an electronic coupon) wherein the real world items cost a larger number of gems than the avatar items and therefore are more sought after and valuable since they are real world items and have external market value. The training system may also permit users of the system to trade purchased "virtual items" with other users using the training system (to create a virtual market) so that there is a community of users of the training system that can interact with each other.

The training system and method may also include a graphical user interface in which each user/student can create/choose an avatar that represents the user/student in an virtual environment created by the graphical user interface. The avatar may have various different attributes that a user/student can select for his/her avatar, such as the clothes of the avatar, the gender of the avatar, the race of the avatar, the body type of the avatar, a decoration/furnishing for the house/room of the avatar in the virtual environment, a vehicle of the avatar in the virtual environment (such as a bicycle, automobile, motorcycle, etc.), a pet of the avatar in the virtual environment, etc. so that the user/student can customize the appearance of the avatar. Much like a video game in which the user has a character that they control within the game, the training system allows the user to control the actions of the avatar within the virtual environment. The virtual environment is shown in Appendix A which is incorporated herein by reference. In particular, FIG. A-1 shows the splash screen of the product. FIG. A-2 shows a screen in which the user of the training system begins to customize his/her avatar by selecting the gender of the avatar. FIG. A-3 illustrates a screen in which the user can customize the features of the avatar (in this example a male avatar. FIG. A-4 illustrates the screen displayed to the user after the avatar has been customized in which the avatar directs the user to do an assessment of the skills of the user. FIG. A-5 illustrates an example of the assessment exercise presented to the user. FIG. A-6 illustrates a screen presented to the user once the training system has determined the appropriate training for the user based on the assessment. FIGS. A-7 to A-12 show different themes (Going West for example) and the subtheme (the smaller circles) and the units (boxes at the bottom) that are provided to the user by the training system. The line in these figures illustrates the progress of the user in the particular theme/sub-theme and the boxes illustrate the progress of the user in the units (with yet to be completed units shown as locks). FIG. A-13 illustrates a screen presented to the user for a training exercise. In the example shown in FIG. A-13, the system is set up to permit the user to select the training/assessment to perform. Alternatively, the screen may also show the "phonics" button for a particular user who is being directed to the phonics training FIG. A-14 shows the phonics training being selected by the user and FIG. A-15 illustrates an example of a initial screen for a particular phonics training which is long and short vowels. FIG. A-16 illustrates an example of an instructional screen for the long and short vowels training FIG. A-17 illustrates an example of a vocabulary training unit of the system. The system permit the user to select whether or not the avatar is shown or how much of the avatar is shown using the rectangular controls in the bottom right corner. The system also displays a number of points earned by the user (7845 in this example) and a gem icon that, when selected, shows the number of gems accumulated by the user as shown in FIG. A-18.

FIG. A-19 illustrates an example of the user interface for a particular game that is part of the training system. FIG. A-20 is an example of a points and gems user interface that permits the user to convert points into gems. FIGS. A-21, A-22 and A-25 illustrate examples of a virtual storefront of the training system where the user (using his/her avatar) can show for items for the avatar and pay for them using the gems. FIG. A-23 illustrates a user interface for the inside of a store shown in the virtual storefront where the user can select items for the avatar as shown in FIG. A-24 wherein the details of each item and the cost of each item (in number of gems) is shown to the user. The user can then purchase an item from the store.

FIG. A-26, A-28 and A-29 illustrate the virtual environment for the avatar including a bedroom (FIG. A-26) and house/garage (FIG. A-28) and a room (FIG. A-29) wherein the items purchased by the user for the avatar are placed into these areas. As shown in FIG. A-27, the user can then select from the items in these areas for use by the avatar such as the different pants shown in FIG. A-27.

FIG. A-30 to A-32 illustrate an example of the different male avatars (with different races) that can be generated by the training system while FIGS. A-33 to A-34 show the female avatars. Finally, FIGS. A-35 and A-36 illustrate additional examples of the avatars that can be customized by the user in the training system.

For example, as part of the positive feedback provided by the training system, the training system may award the one or more gems for various activities in the training system and then user can then use the gems to buy information and/or items for the avatar, such as a different hair style, a cell phone, different clothes, etc. The virtual environment of the training system may thus include a store for the avatar items (from which the avatar may purchase items) wherein the contents of the store may be adjusted based on the shopping options (selected by the user/student or assigned to the user/student), the gender of the avatar or other characteristics. The store may provide a user/student with additional incentives to excel in the training systems exercises. The virtual environment may also include an avatar environment, such as a house, bedroom, etc. of the avatar for the particular user/student (customizable by the particular user/student) wherein the information and items purchased for the avatar may be placed into the avatar environment. For example, when a user purchases a pair of pants for his/her avatar, those pants may appear in the closet of the bedroom of the avatar in the virtual environment so that the user/student can then select those pants to be worn by the avatar. The training system may also track the characteristics of the avatar chosen by each user/student as well as the information/items purchased for the avatar since this data can be used to analyze the interests of the user/student and may then be used to provide targeted additional information to the user/student.

While the foregoing has been with reference to a particular embodiment of the invention, it will be appreciated by those skilled in the art that changes in this embodiment may be made without departing from the principles and spirit of the invention as defined by the appended claims.

What is claimed is:

1. A computer implemented educational training method, the method comprising:

generating an educational training exercise at a particular skill level, the educational training exercise being an exercise to teach a user in reading and literacy;

generating a user interface for the educational training exercise at the particular skill level wherein the user interface for the educational training exercise at the particular skill level is displayed on a computing device to the user;

generating an instructional flow for the educational training exercise at the particular skill level wherein the instructional flow includes a plurality of teaching and testing portions;

providing an early bail out trigger during a teaching or testing portion in an early stage of the instructional flow that is triggered by a processor when poor performance by the user is identified during the teaching or testing portion in the early stage of the instructional flow, and automatically returns the user to immediately restart the educational training exercise at the particular skill level; and providing an early regression trigger during a teaching or testing portion in a later stage of the instructional flow that is triggered by a processor when, after passing the early bail out trigger, poor performance by the user is identified during the teaching or testing portion in the later stage of the instructional flow, and automatically returns the user to immediately restart the educational training exercise at a less challenging or reduced skill level.

2. The method of claim 1 further comprising automatically returning the user to immediately restart the educational training exercise at a less challenging or reduced skill level, if the early bail out trigger is again triggered when, after restarting the education training exercise at the particular skill level, poor performance by the user is again identified during the early stage of the instructional flow for the educational training exercise.

3. The method of claim 1 further comprising providing an early acceleration trigger during the teaching or testing portion in the later stage of the instructional flow that is triggered when exceptional performance by the user is identified during the teaching or testing portion in the later stage of the instructional flow after the user passes the early bail out trigger, and automatically accelerates the user to immediately start at a next more challenging or increased skill level of the educational training exercise.

4. An educational training system, comprising:

a game portion that generates an educational training exercise at a particular skill level, the educational training exercise being an exercise to teach a user in reading and literacy;

the game portion generating an instructional flow for the educational training exercise at the particular skill level wherein the instruction flow includes a plurality of teaching and testing portions;

a computing device, capable of being connected to the game portion, having a display device, the educational training exercise at the particular skill level being displayed on the display device;

the computing device having an input device that allows the user to interact with the educational training exercise at the particular skill level; and the instructional flow for the educational training exercise comprises an early bail out trigger that is triggered by a processor when poor performance by the user is identified during a teaching or testing portion in an early stage of the instructional flow and automatically returns the user to immediately restart the educational training exercise at the particular skill level; and an early regression trigger that is triggered by a processor when poor performance by the user is identified during a teaching or testing portion in a later stage of the instructional flow and automatically returns the user to immediately restart the educational training exercise at a less challenging or reduced skill level even when the user passes the early bail out trigger in the instructional flow.

5. The system of claim 4, wherein the game portion automatically returns the user to immediately restart the educational training exercise at a less challenging or reduced skill level, if the early bail out trigger is again triggered when, after restarting the educational training exercise at the particular skill level, poor performance by the user is again identified during the early stage of the instructional flow for the educational training exercise.

6. The system of claim 4, wherein the instructional flow for the educational training exercise further comprises an early acceleration trigger during the teaching or testing portion in the later stage of the instructional flow that is triggered when exceptional performance by the user is identified during the teaching or testing portion in the later stage of the instructional flow after the user passes the early bail out trigger, and automatically accelerates the user to immediately start at a next more challenging or increased skill level of the educational training exercise.

* * * * *